US007874346B2

(12) United States Patent
Maeda et al.

(10) Patent No.: US 7,874,346 B2
(45) Date of Patent: Jan. 25, 2011

(54) METHOD FOR PRODUCING MANGANESE DRY CELL NEGATIVE ELECTRODE ZINC MATERIAL

(75) Inventors: Mutsuhiro Maeda, Chiyoda-ku (JP); Kazunari Kobayashi, Chiyoda-ku (JP); Yuk Fai Lau, Shatin (HK)

(73) Assignee: Toshiba Battery Co., Ltd., Tokyo (JP)

( * ) Notice: Subject to any disclaimer, the term of this patent is extended or adjusted under 35 U.S.C. 154(b) by 22 days.

(21) Appl. No.: 11/577,267

(22) PCT Filed: Jun. 6, 2005

(86) PCT No.: PCT/JP2005/010378

§ 371 (c)(1),
(2), (4) Date: Apr. 13, 2007

(87) PCT Pub. No.: WO2006/040857

PCT Pub. Date: Apr. 20, 2006

(65) Prior Publication Data

US 2008/0029189 A1     Feb. 7, 2008

(30) Foreign Application Priority Data

Oct. 15, 2004   (JP) ............................. 2004-301215

(51) Int. Cl.
*B22D 11/00*      (2006.01)
*B22D 11/126*   (2006.01)
(52) U.S. Cl. .................. 164/476; 164/459; 164/460
(58) Field of Classification Search ......... 164/459–460, 164/476
See application file for complete search history.

(56) References Cited

U.S. PATENT DOCUMENTS

| 2007/0111096 A1 | 5/2007 | Kobayashi et al. |
| 2007/0134553 A1 | 6/2007 | Kobayashi et al. |
| 2007/0190410 A1 | 8/2007 | Kobayashi et al. |

FOREIGN PATENT DOCUMENTS

| JP | 5 318037 | 12/1993 |
| JP | 6-20689 | * 1/1994 |
| JP | 6 196156 | 7/1994 |
| JP | 7 45272 | 2/1995 |

(Continued)

OTHER PUBLICATIONS

U.S. Appl. No. 12/617,232, filed Nov. 12, 2009 Kobayashi, et al.

(Continued)

*Primary Examiner*—Kuang Lin
(74) *Attorney, Agent, or Firm*—Oblon, Spivak, McClelland, Maier & Neustadt, L.L.P.

(57) ABSTRACT

A method for manufacturing non lead added anode zinc material for manganese dry batteries comprising compounding a zinc alloy by melting zinc, 0.1 mass % or more and 0.7 mass % or less of bismuth and other impurity elements inevitably contained in zinc in a melting furnace; casting the compounded molten zinc alloy to a molded material in the form of a band or in the form of a bar; rolling the molded material in band form to form a zinc alloy sheet; and punching the rolled zinc alloy sheet in a designated thickness into a designated shape.

15 Claims, 5 Drawing Sheets

FOREIGN PATENT DOCUMENTS

| | | |
|---|---|---|
| JP | 7 296813 | 11/1995 |
| JP | 2000 58045 | 2/2000 |
| JP | 2003 502499 | 1/2003 |
| WO | WO 00/77868 | * 12/2000 |

OTHER PUBLICATIONS

U.S. Appl. No. 12/621,185, filed Nov. 18, 2009 Kobayashi, et al.
Office Action issued Oct. 5, 2010, in Japan Patent Application No. 2006-540827, filed Dec. 13, 2006 (with English-language translation).

* cited by examiner

METHOD FOR PRODUCING MANGANESE DRY CELL NEGATIVE ELECTRODE ZINC MATERIAL

TECHNICAL FIELD

This invention relates to methodology of manufacturing less-pollutive anode zinc material for manganese dry batteries, as compared to conventionally and currently available material, without using lead or adding it to zinc that is anode active material.

BACKGROUND OF THE INVENTION

Normally 0.1 to 0.7 mass % of lead is added to zinc, anode active material for manganese dry batteries, purpose being to increase ductility for rolling and forming and corrosion prevention.

Lead deters cracks to run around the edges of a sheet in rolling ingot and on the wall of a can in forming the sheet.

It also acts to protect the can from electrolyte and corrosive impurities to corrode and to preserve a battery from deterioration due to self discharge.

So lead is a metal element effective both in process-ability and corrosion resistance as an additive for anode zinc. And because of its vital role, it has been thought almost impossible to exclude lead from anode zinc material for manganese dry batteries. However, lead is an environmental hazardous material, and supply of anode zinc material without additive of lead is seriously demanded and development is actively conducted thereof.

(Reference: JP6-196156A)

While development of anode active material without addition of lead has been conducted for some time, it is known that adding bismuth instead lead to pure zinc makes comparatively good corrosion resistance of the material and process-ability for rolling sheets and forming cans. (Reference: JP7-45272A)

The inventor conducted an experiment of the referenced technology by making an anode material and testing through the manufacturing process generally done. The process: making a bar of ingot by casting melted zinc alloy with bismuth into a mold and cooling down; rolling the ingot by a rolling mill to a zinc sheet in a given thickness; and punching the sheet with a press machine to a circular or hexagonal pellet to form a finished can. As a result; a can was made out anyhow; but progress of cooling was too slow and irregular or large rough crystals grew in the zinc sheet, which caused cracks around the rims of the zinc sheet; so material yield was quite poor and possible high rate of 'No Good' mixed in finished cans was feared for mass production.

The bismuth-added ingot could not be processed by a continuous casting and rolling system, which is the system for the lead-added ingot, because of breakage of molded sheets joining one another in band during extrusion and cracks at both sides before and after entering into the rolling mill. The range of processing parameters is narrower and optimization of manufacturing is extremely difficult for bismuth-added ingot, as compared for lead-added one. In fact, no example of successful manufacturing a zinc sheet exists from bismuth-added active anode material until today.

Conventional system detaching casting and rolling, where casting is followed by cooling in natural speed and then rolling proceeds, is impracticable either, because of low productivity for slow cooling, cracks, and defective finished cans; insurmountable disadvantage of productivity and cost.

As obvious from the described above, to realize manufacture and supply inexpensive and substantially lead-free manganese dioxide dry batteries, imperative is to solve the problems such as breakage, cracks, process parameters, and productivity involved in process by continuous casting and rolling system. That is one of today's most urgent and challenging task.

DISCLOSURE OF THIS INVENTION

Breakage of a zinc sheet during process from casting to rolling is due to large, irregular or rough crystals which bismuth precipitates into the crystalline structure and growing acicular crystals, whereas that is not a case with lead-additive; no growing acicular crystals, the crystalline structure keeping evenly scattered minute crystals.

The same temperature as for rolling lead-added ingot was applied to bismuth-added ingot in the experiment, and that proved to be wrong with deep cracks in the side sections of the zinc sheet for low yield of zinc pellets and defective cans.

This Invention was made to solve the problems involved in manufacturing anode zinc material without adding lead and aims to present a method of manufacturing practicable and defect-less non-lead-added zinc alloy and sheets.

The first phase of this Invention is a method of manufacturing a non-lead-added manganese dry battery which method contains at least an alloy compounding process to make a lot of zinc alloy by melting in a melting furnace the material containing zinc with addition of bismuth by 0.1 mass % to 0.7 mass % and other elements of inevitably accompanied impurities in zinc; and A casting process to make a molded material from the melted alloy with a casting machine; and a rolling process to roll the sheet; and A punching process to punch circular or hexagonal pellets out of the rolled sheet.

The second phase of this Invention is a method of making ingot with individual molds by natural cooling of the cast zinc alloy and method of subsequent processes to make anode zinc material for manganese dry batteries.

Productivity can be increased by rapid solidification of the melted alloy, cooling by water surrounding the mold, whereby crystals become minute preventing from cracks of a zinc sheet in rolling and also providing a number of molds enabling non-stop cooling process. But preferable is rolling the ingot in 2 or 6 times.

ADVANTAGE OF THIS INVENTION

This Invention materializes a casting and rolling method to enable manufacturing a crack-less and breakage-free stable and reliable quality of non-lead-added anode zinc for a manganese dry battery and realizes supply of inexpensive and environment friendly anode zinc material for manganese dry batteries.

BRIEF DESCRIPTION OF THE DRAWINGS

FIG. 3 depicts a brief cross sectional view of a manganese dry battery this Invention is applicable to.

FIG. 4 depicts a brief cross sectional view of a manganese dry battery this Invention is applicable to.

DETAILED DESCRIPTION OF THE PREFERRED EMBODIMENTS

Embodiment Example of the First Phase

Figure 1:
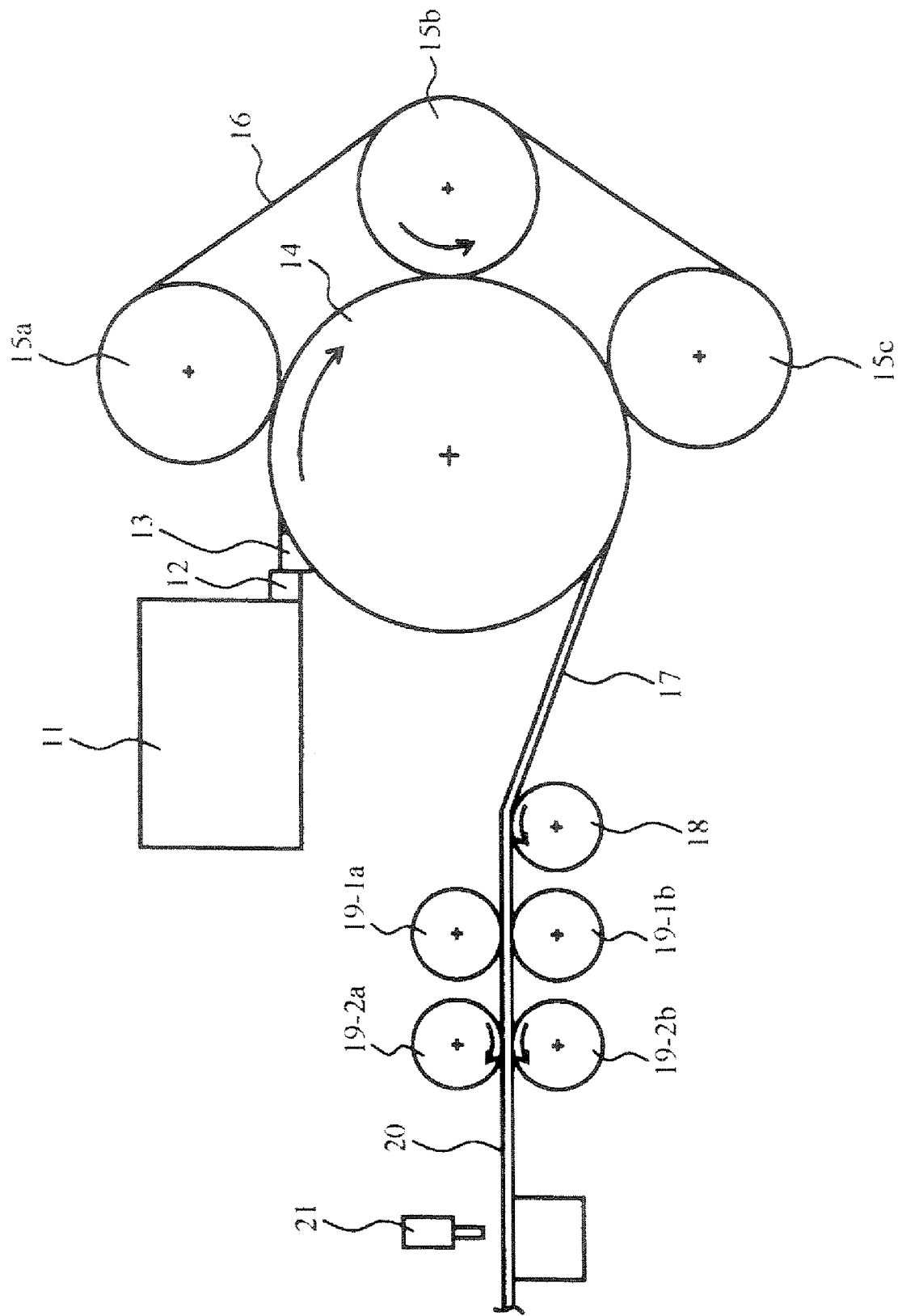
FIG. 1 is a brief description of a manufacturing system for embodiment 1 of this Invention.
Figure 3:
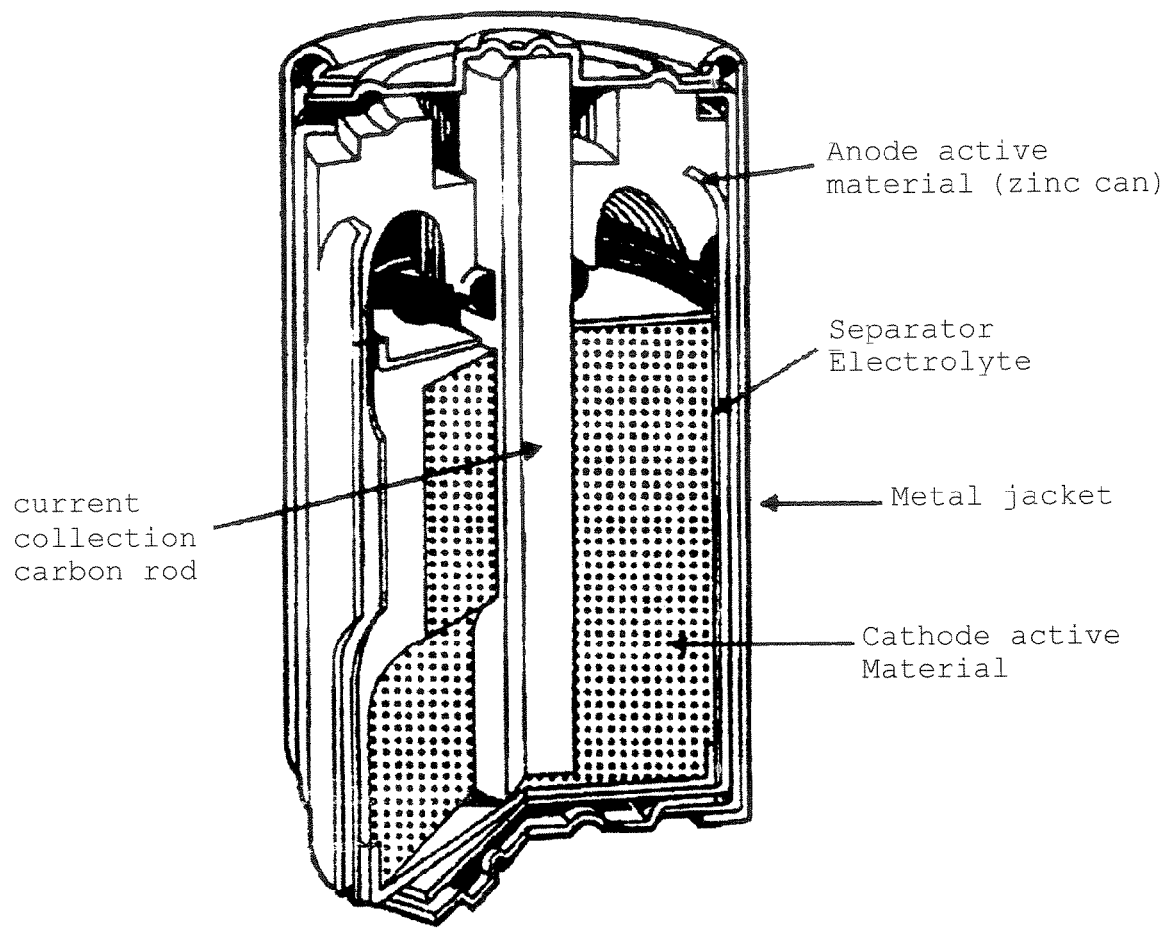
Figure 4:
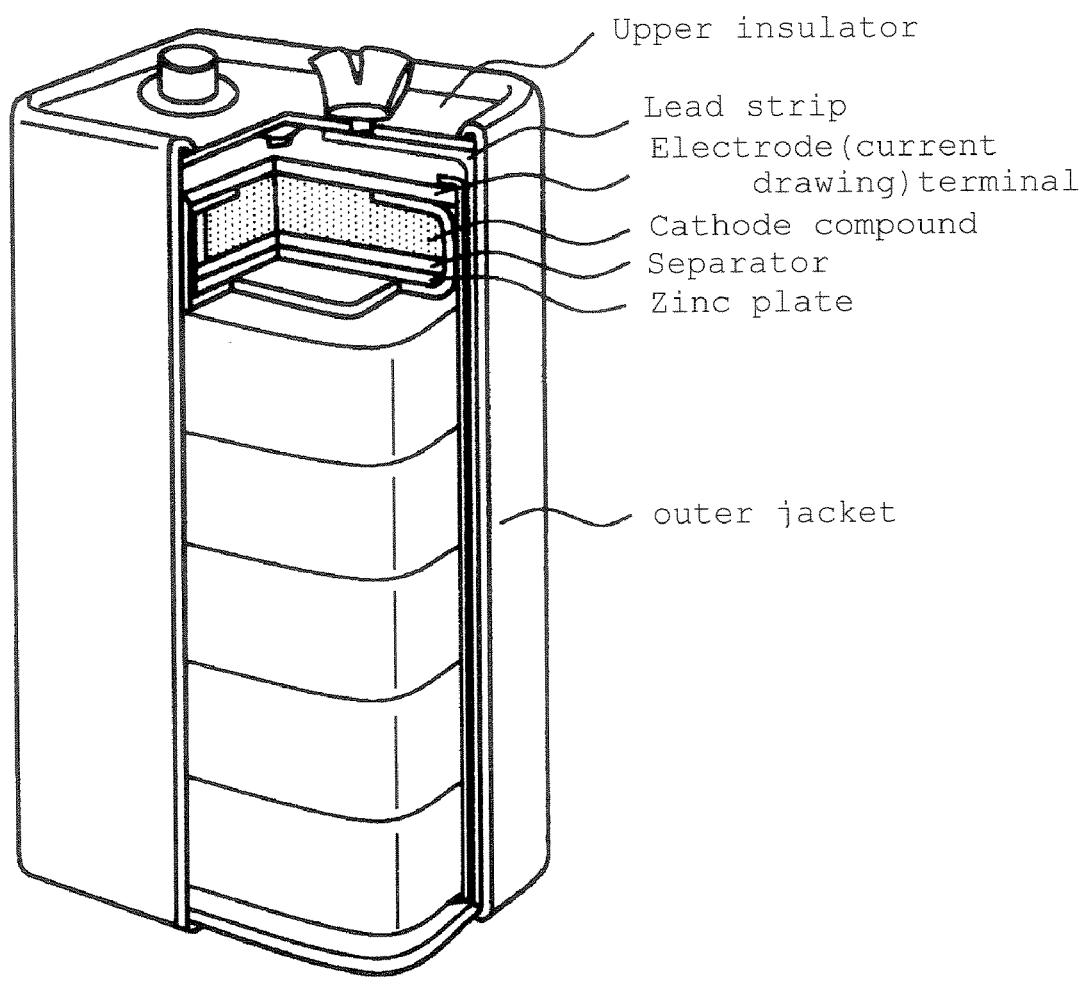

Following describes an embodiment example of the first phase of this Invention in a manufacturing method of anode zinc material for manganese dry batteries referring to the FIG. 1, a brief description of the manufacturing system. The manufacturing method is comprised of an alloy compounding process to compound zinc alloy in a melting furnace, a casting process to mold melted alloy, a rolling process to roll the molded alloy ingot to a zinc sheet with a rolling machine, and a press process to punch the zinc sheet to pellets in such shapes as circle, hexagon, or quadrilateral, of which 4 corners are chamfered, for quadrilateral laminated manganese dry batteries 6F22 of JIS standard as shown in the FIG. 4 or cylindrical dry batteries in the FIG. 3.

Figure 7:
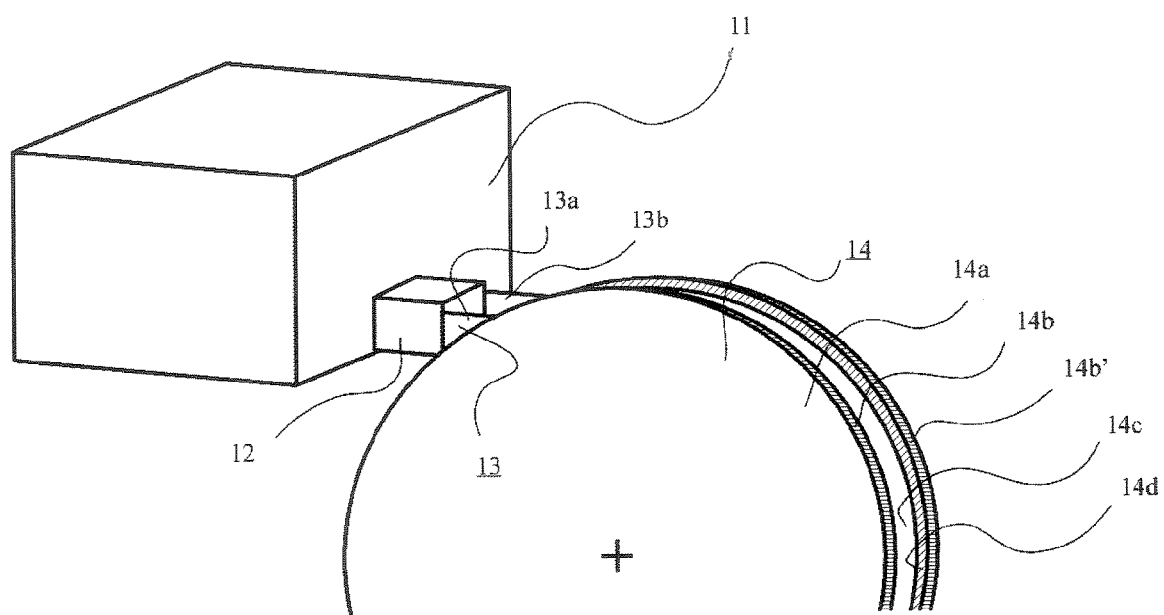
FIG. 7 is an enlarged image of the manufacturing system of FIG. 1.

This is a detailed description of the casting system. The FIG. 1 shows the casting system for embodying this Invention. The FIG. 7 shows an enlarged image of the key area of the casting system. As shown in the FIG. 1, the area of this system for casting molten zinc alloy consists of the melting furnace marked 11, an outlet marked 12 to take the molten alloy out of the furnace, a mold marked 13 to guide and feed the molten alloy from the outlet to a groove marked 14c made on a periphery of a rotate-able disc marked 14. As depicted in the FIG. 7, the mold 13 is incorporated with molten guiding and molding parts, called side dams marked 13a and 13b with a bottom cover (not shown in the drawing). The side dams and the bottom are positioned to contact the periphery 14b and a side wall (14d) as they rotate as the disc does, and the molten alloy is fed to the groove (14c) of the disc (13) and is cast there. Important is heat control of the casting process, and desirable is to control heat with equipment for heating, cooling, and measuring temperature. (The equipment is not described in the drawing.) Contacting the disc (14), three pulleys (15a) (15b) and (15c) are arranged, and a heat-resistant belt (16) is stretched over the pulleys. The molten alloy zinc is cooled in the space formed by the disc's groove (14c) and the belt (16), and becomes molded material in band form. Then the material is rolled by a single or numbers of roller 19 to a zinc sheet marked 20 in a specified thickness for punching process to designated shapes of pellets as marked 21.

Following is further details of the processes.

Alloy Compounding Process

First compound zinc alloy by adding bismuth to pure zinc and melt in the melting furnace 11. The amount of bismuth is to be 0.1 to 0.7 mass % of the compounded alloy.

This addition of bismuth significantly upgrades corrosion resistance of zinc and deters self-deterioration of a battery. Furthermore, adding magnesium to the alloy makes composing crystals minute for better cast-ability.

Preferable amount of magnesium to add is to be more than 0.0005 mass % and less than 0.05 mass % of the alloy composition. That hardens anode zinc material and makes its crystals minute for casting, thereby preventing from breakage of the band-form molded alloy at the exit of the casting system and from cracks in the rolling process. But excessive addition of magnesium is not desirable, for it makes undesirable Vicker's hardness of the zinc sheet for bad process-ability in making cans. It is in this process that lead added to zinc alloy effects favorably for mold-ability. This Invention rejects lead as additive for environmental consideration, while it does not exclude lead as an inevitable impurity contained in the zinc alloy accompanied with zinc ground metal. Likewise impurities such as Fe, Cu, Cd, Sn, Al, and other elements do not matter for this Invention as far as they are contained in a level of amount of inevitable impurities.

Casting Process

The molten zinc alloy made in the previous process is fed to the mold (13) from the outlet (12) of the melting furnace (11) and is molded to a band-form material by the rotating casting disc. The casting system is provided with the rotating disc (14), a circular rotating component which can be cooled by water and has a groove on the rim. Contacting the disc, pulleys (15a), (15b), and (15c) are provided, and the heat-resistant belt (16) like a steel belt is stretched over three pulleys. This belt (16) moves toward same direction in the same speed as the disc (14) rotates. The molten zinc alloy is filled in the disc's groove and cooled to the molded band-form material in the space formed by the belt and the disc groove.

More than 400° C. and less than 600° C. is a preferable range of temperature of the molten zinc alloy when it is fed from the melting furnace's (11) outlet (12) to the disc (14). If the temperature is out of that range, obtainable molded band-form material tends to break. And preferable is rapid solidification of the disc (14) to cool molten zinc alloy thereon for minuteness of the crystals.

Water cooling can be applied to rapid solidification of the disc (14). That is done by incorporating a water-way inside the disc (14), and cooling by pouring water below 40° C. at water pressure about 0.2 MPa into the disc.

Adoption of those process conditions suppresses acicular crystals to take place and grow in the molded band-form material, whereby breakage and cracks are prevented in the subsequent processes.

The thickness of a molded band-form material is decided by the depth of the groove on the periphery rim of the disc (14).

A thin molded band is less breakable and easy for handling. But there is a limit for thinness, since property of an anode zinc material to be completed is restricted and defined by mechanical strength and electric potential of a battery to be made out. Thinning the molded band excessively results in lowering compression rate in the rolling process, and the quality of a sheet after rolling may be not good for voids within the sheet. This thickness for molding band is set up according to the thickness of zinc pellets to be punched out and compression rate of band thickness and pellet thickness.

If a molded band is thick, it is breakable by bending. To make the molded band in a thickness more than 30 mm, diameter of the rotating disc (14) is preferably to be more than 200 cm. To make the molded band more than 1 mm and less than 30 mm thick, preferable diameter of the disc (14) is 20 to 200 cm. An application of a diameter less than above-mentioned range resulted that the molded band (17) tends to break around the exit of the casting machine because of curvature, with many cracks on the surface of the band (17), and manufacturing was so low in yield and uneconomical. On the other hand, larger diameters of discs causes longer cooling time, requiring speed down in cooling, and restricting range of heat control to set to the casting machine.

In the molded band from this process, acicular crystals of the zinc alloy are found epitaxial orthogonally to the direction of length of the molded band. Those acicular crystals are supposed to emerge as cooling of interior area of the band tends to delay than the upper and the lower surface, while the band is cooled from the upper and the lower faces. If many acicular crystals take place, the molded band becomes breakable and tends to get cracked in the subsequent rolling process.

Figure 5:
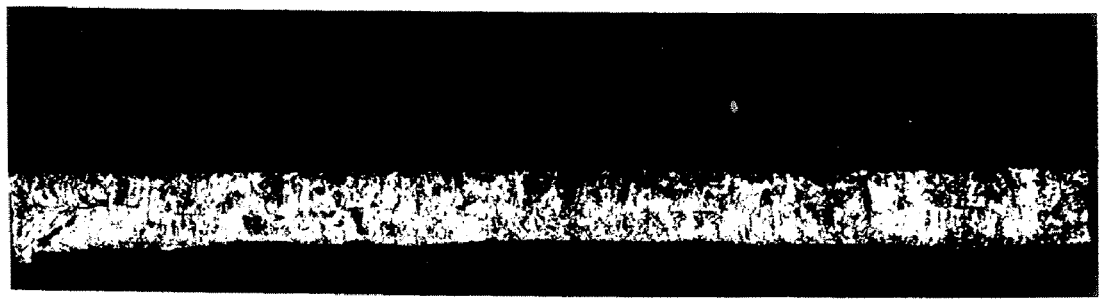
FIG. 5 displays a picture of a metal structure of a zinc sheet containing acicular crystals as being cut vertically to a length direction.
Figure 6:
FIG. 6 displays a picture of a cross sectional view of a metal structure of a zinc sheet containing almost no acicular crystals as being cut vertically to a length direction.

The acicular crystals as called in this Invention refers to those crystals epitaxial anisotropically, which are located in the FIG. 5 and the FIG. 6. The FIG. 5 shows cross section of the band as being cut vertically to the length direction, which cross section contains acicular crystals. The FIG. 6 is the picture of a cross section of a band which crystal structure contains almost no acicular crystals. As seen in the FIG. 5, those crystals are meant herein to be of not necessarily a perfect crystal structure, but also of one axis anisotropical crystal structure and of an imperfect crystal structure with anisotropy.

As observed at the crystal structure of cross section of a molded band that was gradually or slowly cooled, the crystals were large and rough, acicular crystals existed, and the band was breakable. Observation of the crystals in the cross section of a zinc sheet or strip after rolling gave a clue that by making the crystal grains of zinc alloy material to uniform size and average grain diameter less than 75 μm after rolling, a zinc sheet roll under favorable conditions was obtainable for zinc anode of manganese dry batteries. That means, if the average grain diameter of zinc crystals is more than 75 μm, the zinc sheet is likely to crack or break and continuous casting may fall impossible; undesirable. And it is imperative that more than 10% of large and rough crystals larger than 200 μm diameter shall not exist in a zinc sheet or strip for manufacturing sheets or strips in good quality. The cross section was the face of the zinc sheet or strip being cut or grinded to an optional direction, and the surface observed was an area with average or typically common crystal structure of the relevant cross section.

Rolling Process

The molded band-form material made in the preceded process is conveyed to the rolling process by a guide roller marked 18. The rolling system consists of at least 2 pairs of twin roller 19-1a, b and 19-2a, b. The molded band is rolled under an adequate pressure, and a zinc alloy sheet is made out. Thickness of the sheet is decided depending on the type and the size of dry battery to fabricate, and thickness for zinc pellets for zinc cans is normally set in a range of 4 to 7 mm.

For the rolling process 100 to 190° C. of temperature for the molded band-form material is preferred before the material enters into the rolling process. By setting the heat to this range, cracks can be prevented from running at the side edges of the rolled sheet.

Preferable compression rate (thickness of a sheet after rolling to thickness of the molded band before rolling) is in a range more than 30%. In case of the compression rate lower than that range, voids conceived in the interior of the molded band remain after the rolling process and deteriorates quality of the pellets. Composition of the alloy of this Invention more likely causes cracks at the side edges of the rolled sheet than that of the lead-added alloy does, and intensive compression for once is not desirable for deterioration of the metal structure of the rolled sheet incurring some problems. To avoid that, desirable is rolling for 2 times and is to reduce compression rate for 1 time of rolling. However rolling in more than 6 times reduces the temperature of material surface, which incites cracks and should be avoided.

Press Process

A zinc sheet marked 20 in FIG. 1 made by the rolling process is punched to quadrilateral, which 4 corners to be chamfered, circular or hexagonal pellets with a press machine marked 21. The pellets are used for anode zinc plates for 6F22 batteries or anode zinc cans with bottom cover for cylindrical manganese dry batteries by deep-drawing. The batteries are fabricated by assembling those plates or cans together with other parts such as cathodes, positive electrodes and current collectors. A press machine generally known can be used. The system consist of an abutment, a die in a designated shape for fixed onto the abutment, a tap fit into the depressed inner part of the die, and a driving device to thrust the tap into the die and draw out. A zinc alloy sheet is placed in the gap between the die and the tap, and is punched by driving the tap. Normally a die and a tap are replaceable, and suitable pair of die and tap are installed to punch the sheet to a required shape.

2nd Phase of Embodiment

Following describes 2nd phase of manufacturing method to embody this Invention.

Foregoing 1st phase is a continuous and throughout manufacturing from the casting process to the press process, but that is one of alternative methods, and continuation of the processes is not essentially required just for manufacturing. This 2nd phase is the manufacturing method by separated processes in one or some processes. The FIG. 2 is a brief description of the processes from casting to rolling, separating the punching process.

Marking of the parts is same as for the FIG. 1 with omission of detailed description of the parts.

Figure 2:
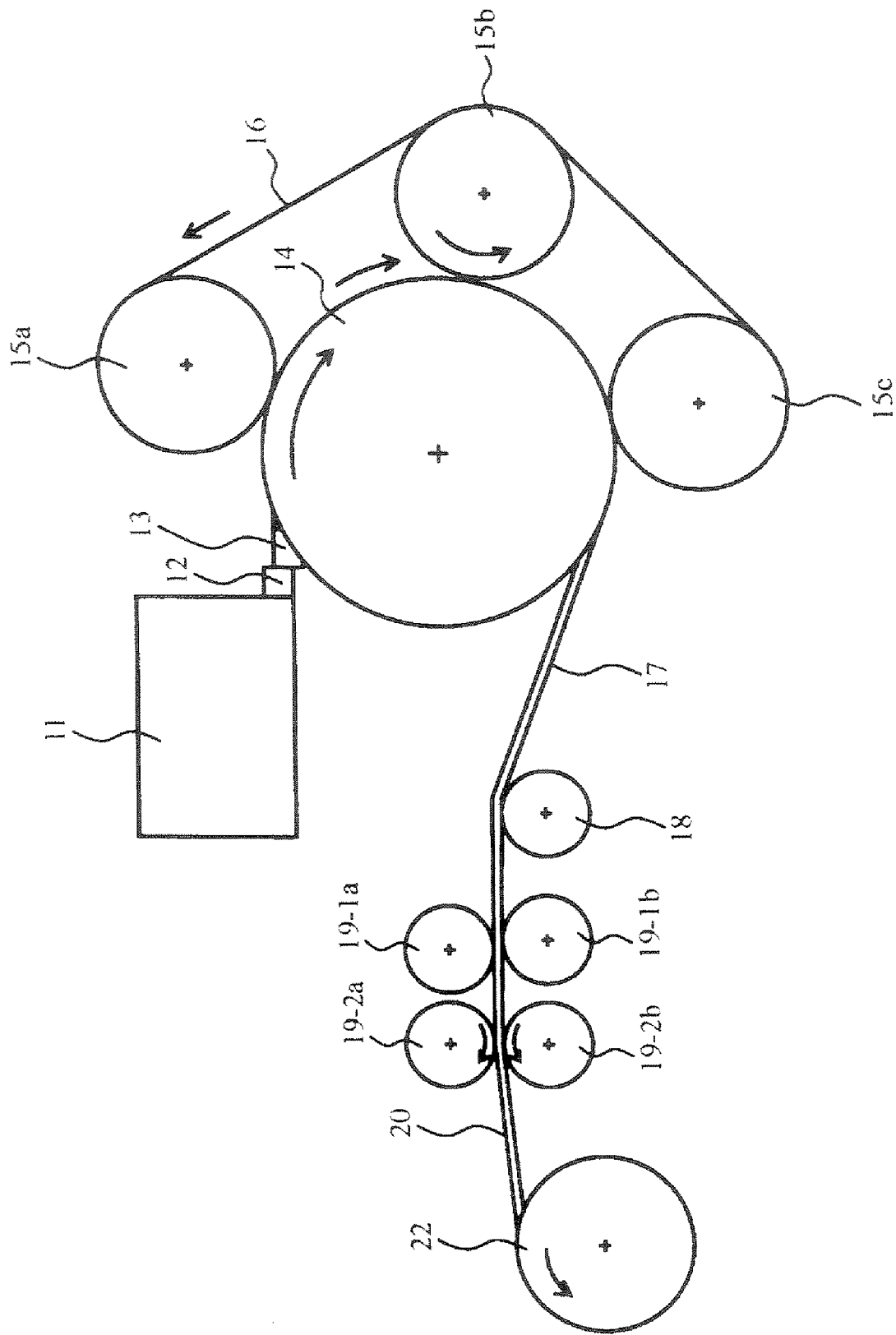
FIG. 2 is a brief description of a manufacturing system for embodiment 2 of this Invention.

As shown in the FIG. 2, the compounded and melted zinc alloy in the melting furnace is molded to band-form molded material, which is roll formed by the rollers 19-1a, b and 19-2a, b to the zinc sheet (20) in a required thickness. The sheet (20) is wound to a roll of a specified diameter. Subsequently the sheet is rewound and is punched to anode zinc pellets. Alternatively the band-form molded material can be cut to a specified length, and fed to subsequent process in a form of zinc strip. Also possible is to cut the sheet after the casting and the rolling processes, and fed to the punching process. By these methods, the casting, the rolling, and the punching processes are detached at one or some junctures, whereby flexibility of the manufacturing process is enhanced for better workability.

Same conditions such as heat or temperature as for the phase 1 can be applied to this phase 2 of manufacturing method.

3rd Phase of Embodiment

Following explains 3rd phase in manufacturing method of this Invention.

In this method a number of individual molds are provided and each mold is pour filled with the molten zinc alloy, which mold with molten in it is dipped into a water tank with cooling water below 40° C., whereby the molten is rapidly cooled and solidified. Rolling the molded material in a heat from 100 to 190° C. to sheet (s), which sheet is punched or then deep-drawn to be zinc plates or zinc cans for manganese dry batteries. For this method such a system as for the phase 1 or 2 is unnecessary. That is an advantage of manufacturing with less capital investment for machinery and equipment.

Embodiment Example

Alloy composition: 100 kg pure zinc and different additives for the embodiment examples 1 to 9 and the comparative examples 1 and 2 as indicated in the Table 1 herein below. Manufacturing system as of Drawing 2 equipped with 100 cm diameter disc.

Disc diameter: 100 cm

Molten zinc alloy temperature in the mold: 450° C.

Thickness of molded zinc alloy material: 15 mm

Cooling water temperature: 32° C.

Temperature of the molded zinc alloy material on entering to the rolling system: 110° C.

Number of twin roller: 2 pairs

A test was conducted on the zinc pellets punched out of the zinc sheet made by foregoing method to verify if they are useable without quality problems.

A number of R20 manganese dry batteries were fabricated using above-mentioned zinc pellets and evaluation was done on the batteries.

First cathode compound was prepared by dry mixing of cathode active material, manganese dioxide for major ingredient, and acetylene black for conductive material, followed by spraying electrolyte to the compound and wet mixing thereof.

Making a Battery

Insertion of a cylindrical separator and a dish shaped bottom insulating paper into the inner wall of the zinc can.

Insertion of formed cathode compound into the can; mounting a piece of pressure receiving paper atop the compound; pressing atop so as to adhere the zinc can, the separator and the cathode compound tightly each other.

Press fitting a carbon rod, the current collector into the center of cathode compound. The separator becomes wet by the electrolyte eluted from the cathode.

Coating sealing material onto the contacting faces of a plastic sealing plate and the carbon rod. And, putting the sealing plate onto the can opening. Putting a bottom cover plate for the negative terminal and a bottom ring onto the can bottom.

Cover the battery overall with a piece of heat shrink tube. Put the positive terminal plate contacting the carbon rod and plastic seal.

Crimp seal whole can with the medium of a insulating ring. That completes a manganese dry battery.

After storing the battery in a constant temperature chamber of 20° C.±2° C. for 10 days and further storing in a constant temperature tank in 45° C. for 30 days, the batteries were discharged with a load of 40 ohm (Ω) for 4 hours a day in a room temperature. Subsequently evaluated was life characteristic at the time of 0.9 V, and obtained was relative values to 100 the standard representing the characteristic of conventional and currently available batteries. The number of the samples was 9 of R20 made in this work.

Corrosion-Resistant Test of the Anode Zinc Can

Following explains about corrosion-resistant test of the material for the anode zinc can.

Cutting test samples (a piece 0.3 mm thick 10.0 mm width, 50.0 mm length) out of the zinc cans, the samples were polished at their surface and cross section to mirror face status with the sand papers #400, #600, #800, #1000 and #1200, and were degreased in an Ultrasonic Cleaner. The liquid used was of 10 mass % of NaOH and water. The degreased sample was weighed in 0.1 mg accuracy and then dipped into electrolyte in a constant temperature water tank. Weight decrease of the sample after 66 hours in 45° C. was taken for decrease by corrosion or corrosion-decrease.

As obvious from the Table 1 below, while addition of bismuth 0.05 mass % as in the comparative example 1 resulted in much of corrosion-decrease and low relative life value, every embodiment example of this Invention proved less than 3.7 mg of corrosion-decrease and not more corrosion-decrease and not less relative life value than those of lead-added material as shown by the reference example in the same table. In case of the comparative example 2, 1.0 mass % bismuth added, improvement in corrosion-resistance is not very much for the amount added incurring undesirable increase of the material cost. And, excessively added bismuth thickly covers reacting phase of zinc and deters discharge reaction of the battery, decreasing the relative life value. The zinc pellets by the manufacturing method of this Invention have competent corrosion-resistance and life characteristic and are useable enough, for batteries in mass production. And, the embodiment examples had very few cracks endorsing superior process-ability of the zinc alloy material by the manufacturing method of this Invention.

TABLE 1

|  | Added element (mass %) | Corrosion-decrease (mg) | Relative life value |
|---|---|---|---|
| Reference example | Pb 0.3 | 4.8 | 100 |
| Comparative example 1 | Bi 0.05 | 10.3 | 95 |
| Embodiment example 1 | Bi 0.1 | 3.7 | 101 |
| Embodiment example 2 | Bi 0.3 | 2.1 | 101 |
| Embodiment example 3 | Bi 0.5 | 1.4 | 101 |
| Embodiment example 4 | Bi 0.7 | 1.2 | 102 |
| Comparative example 2 | Bi 1.0 | 1.2 | 96 |
| Embodiment example 5 | Bi 0.3 Mg 0.0003 | 2.0 | 100 |
| Embodiment example 6 | Bi 0.3 Mg 0.0005 | 2.1 | 101 |
| Embodiment example 7 | Bi 0.3 Mg 0.01 | 2.1 | 101 |
| Embodiment example 8 | Bi 0.3 Mg 0.05 | 2.2 | 100 |
| Embodiment example 9 | Bi 0.3 Mg 0.07 | 2.8 | 98 |

From above-mentioned result, it is known that; preferable amount of bismuth to add is more than 0.1 mass % and less than 0.7 mass %; magnesium more than 0.0005% and less than 0.05 mass %.

Magnesium additive less than 0.0005% is undesirable for shortage of mechanical strength (hardness) of a zinc can or pellets; more than 0.05 mass % is also undesirable for increase of corrosion-decrease, though that may be still in a tolerable range, and for decrease of relative life value.

Alloy Composition: Crystal Condition

Embodiment Example from 10 to 13, Comparative Example 3 & 4

Zinc sheet manufacturing test was conducted by using manufacturing system equipped with 100 cm diameter disc as of FIG. 2 varying alloy composition with constant casting and rolling condition as shown below. Appearance and cross sectional crystal condition of the manufactured zinc sheets were checked. Results are shown in Table 2.

Process Parameters

Casting disc diameter: 100 cm

Zinc band thickness on the exit of casting machine: 15 mm

Molten zinc alloy temperature in mold: 450° C.

Cooling water temperature: 32° C.

Molded zinc band temperature on entering to rolling system: 110° C.

Number of rolling twin roller: 2 pairs

As seen in the Table 2, addition of bismuth in a range from 0.1 to 0.7 mass % made a favorable result both in casting and rolling. 1.0 mass % as in Comparative example 4 resulted in breakage of the molded zinc band on the exit of the casting machine and cracks of the zinc sheet after rolling.

Magnesium in addition to bismuth within above-mentioned range produced also desirable outcome. Thus it became clear that no problem is there in single addition of bismuth or addition of magnesium together with bismuth in the specified range of amount.

A result of checking cracks in the zinc sheet after rolling was classified to 4 levels of excellent, good, pass, and failure according to the following criteria.

excellent: No cracks, no chipping off, very good conditions after-rolling good: Only a few light cracks and chipping off around the edge area, no problem for punching out pellets pass: cracks and chipping off around the edge area, useable enough for punching out pellets, degrading material yield to some extent failure: Many cracks running deep into punching area, unusable for punching out pellets

TABLE 2

|  | Bi added amount (Mg added amount) | Breakage of zinc band at casting machine exit (%) | Crystal condition of zinc band at casting machine exit (rate of acicular crystal) (%) | Crack of zinc sheet after rolling (excellent, good, pass, failure) |
|---|---|---|---|---|
| Comparative example 3 | 0.05 | 0 | 9 | pass |
| Embodiment example 10 | 0.1 | 0 | 6 | good |
| Embodiment example 11 | 0.3 | 0 | 4 | excellent |
| Embodiment example 12 | 0.5 | 0 | 5 | excellent |
| Embodiment example 13 | 0.7 | 0 | 7 | good |
| Comparative example 4 | 1.0 | 10 | 17 | failure |
| Embodiment example 14 | 0.3 (0.005) | 0 | 4 | excellent |
| Embodiment example 15 | 0.3 (0.05) | 0 | 5 | excellent |

Molten Zinc Alloy Temperature in the Mold

Embodiment Example 16 to 20

Alloy compound: 100 kg pure zinc, additive 0.3 mass % bismuth

Manufacturing system: FIG. 2

Varied temperature for molten zinc alloy in the mold

Casting machine disc diameter: 100 cm

Thickness of molded zinc band at casting machine exit: 15 mm

Cooling water temperature: 32° C.

Zinc band temperature on entering to rolling system: 110° C.

Number of rolling twin roller: 2 pairs

TABLE 3

|  | Molten zinc alloy temperature in mold (° C.) | Breakage of zinc band at casting machine exit (%) | Crystal condition of zinc band at casting machine exit (rate of acicular crystal) (%) | Crack of zinc sheet after rolling (excellent, good, pass, failure) |
|---|---|---|---|---|
| Embodiment example 16 | 300 | 0 | 12 | pass |
| Embodiment example 17 | 400 | 0 | 9 | good |
| Embodiment example 18 | 500 | 0 | 4 | excellent |
| Embodiment example 19 | 600 | 0 | 8 | good |
| Embodiment example 20 | 700 | 0 | 10 | pass |

From above-mentioned test, 400 to 600° C. turned out to be the most preferable temperature of the molten zinc alloy in the mold.

Cooling Water Temperature

Embodiment Example 21 to 25

Alloy compound: 100 kg pure zinc, additive 0.3 mass % bismuth

Manufacturing system: FIG. 2

Varied cooling water temperature

Casting machine disc diameter: 100 cm

Molded zinc band thickness at casting machine exit: 15 mm

Molten zinc alloy temperature in mold: 450° C.

Molded zinc band temperature on entering to rolling system: 110° C.

Number of rolling twin roller: 2 pairs

TABLE A4

|  | Cooling water temperature (° C.) | Breakage of zinc band at casting machine exit (%) | Crystal condition of zinc band at casting machine exit (rate of acicular crystal) (%) | Crack of zinc sheet after rolling (excellent, good, pass, failure) |
|---|---|---|---|---|
| Embodiment example 21 | 10 | 0 | 7 | good |
| Embodiment example 22 | 20 | 0 | 3 | excellent |
| Embodiment example 23 | 30 | 0 | 4 | excellent |
| Embodiment example 24 | 40 | 0 | 8 | good |
| Embodiment example 25 | 50 | 0 | 12 | pass |

From the test result, a temperature lower than 40° C. turned out to be suitable for cooling water.

Optimum Temperature for Molded State Band-Form Material on Entering to Rolling System Embodiment Example 26 to 33

Alloy compound: 100 kg pure zinc, additive 0.3 mass % bismuth

Manufacturing system: FIG. 2

Varied temperature for molded band-form material on entering to rolling system

Casting machine disc diameter: 100 cm

Molded band-form material at casting machine exit: 15 mm

Molten zinc alloy temperature in mold: 450° C.

As obvious from the Table 5, undesirable is too low or too high temperature for the molded band-form material just before entering into the rolling system for cracks.

Rolling is preferably to be done for plural number of times; 4 times of rolling to a given thickness gave a good result in crystal condition with very few cracks; 6 times or more of rolling turned out not very desirable as the material temperature dropped and the crystals became rough and large causing cracks.

TABLE 5

| | Molded band-form material temperature on entering to rolling system (° C.) | Breakage of zinc band at casting machine exit (%) | Crystal condition of zinc band at casting machine exit (rate of acicular crystal) (%) | Crack of zinc sheet after rolling (excellent, good, pass, failure |
|---|---|---|---|---|
| Embodiment example 26 | 85 | 0 | 10 | pass |
| Embodiment example 27 | 100 | 0 | 7 | good |
| Embodiment example 28 | 150 | 0 | 3 | excellent |
| Embodiment example 29 | 190 | 0 | 8 | good |
| Embodiment example 30 | 202 | 0 | 12 | pass |
| Embodiment example 31 | 190 4 times rolling | 0 | 7 | excellent |
| Embodiment example 32 | 190 6 times rolling | 0 | 8 | good |
| Embodiment example 33 | 190 7 times rolling | 0 | 9 | pass |

Disc Diameter

Embodiment Example 34 to 48

Band-form materials were manufactured using manufacturing system as of FIG. 2 from zinc alloy prepared by adding 0.3 mass % bismuth to 100 kg pure zinc. Casting machine disc diameter was varied under casting condition shown in Table 6. Finally, appearance and cross sectional crystal condition of the manufactured band-form materials and zinc sheets were checked.

Concerning thickness of molded band-form material, the thinner it is, the better it is for flexibility not easily breakable, however, compression ratio must be counted at least 30% for the rolling process and the thinness is limited by the thickness of zinc pellets to be punched out of a zinc sheet after rolling. If the molded material in band-form is thick, it may happen that the material breaks around the exit of the casting machine, and in this case it is advisable to use a disc of large diameter and to arrange the material so as it may not curve very much in coming out of the disc in cooled and semi-solidified status and laying flat on the conveyor.

Molten zinc alloy temperature in mold: 450° C.

Cooling water temperature (° C.): 25° C.

Molded zinc band on entering to rolling system: 110° C.

Number of rolling twin roller: 2 pairs

To verify above-mentioned points, changing the disc diameter in a range from 18 cm to 220 cm and setting the material thickness at 1 mm to 30 mm, a manufacturing test was conducted with conditions indicated in the Table 6 below.

The test outcome was as follows.

Thickness set at 1 mm

With the 18 cm diameter of disc, the band-form molded material broke at the casting machine exit. With diameters above 25 cm, up to 200 cm manufacturing was manageable without fatal problems. Temperature of a molded material is controlled by adjusting amount of cooling water so as not to drop too rapidly. In case of a thickness as thin as 1 mm, the material is rapidly cooled to the core, whereby not many acicular crystals seem to emerge. Therefore, while larger diameters of the casting machine are used with ones up to 200 cm, cracks were few within a manageable range by controlling cooling water volume.

On the other hand, in case of molded band as thick as 30 mm with a large disc of 220 cm diameter, no breakage happened, but with a small disc of 18 cm many acicular crystals took place on the cross section of the molded zinc band on coming out of the exit of the casting machine causing many cracks at the edge side area of the zinc sheet after rolling; the sheet was unusable. This looks attributable to a fact that because of thickness the core area of the material is not rapidly cooled but slowly and gradually, whereby incited was emergence and growth of acicular crystals.

Foregoing result indicates a suitable diameter of a casting machine disc is in a range from 20 to 200 cm, depending on the thickness of the molded band-form zinc material.

TABLE 6

| | Molded band-form material thickness (mm) | Casting machine disc diameter (cm) | Breakage of zinc band at casting machine exit (%) | Crystal condition of zinc band at casting machine exit (rate of acicular crystal) (%) | Crack of zinc sheet after rolling (excellent, good, pass, failure |
|---|---|---|---|---|---|
| Embodiment example 34 | 1 | 18 | 0 | 11 | pass |
| Embodiment example 35 | 1 | 25 | 0 | 7 | good |
| Embodiment example 36 | 1 | 50 | 0 | 4 | excellent |
| Embodiment example 37 | 1 | 100 | 0 | 8 | good |
| Embodiment example 38 | 1 | 200 | 0 | 9 | good |
| Embodiment example 39 | 10 | 18 | 15 | 14 | pass |
| Embodiment example 40 | 10 | 50 | 0 | 6 | excellent |

TABLE 6-continued

| | Molded band-form material thickness (mm) | Casting machine disc diameter (cm) | Breakage of zinc band at casting machine exit (%) | Crystal condition of zinc band at casting machine exit (rate of acicular crystal) (%) | Crack of zinc sheet after rolling (excellent, good, pass, failure |
|---|---|---|---|---|---|
| Embodiment example 41 | 10 | 100 | 0 | 5 | excellent |
| Embodiment example 42 | 10 | 200 | 0 | 8 | good |
| Embodiment example 43 | 10 | 220 | 0 | 13 | pass |
| Embodiment example 44 | 30 | 18 | 10 | 14 | pass |
| Embodiment example 45 | 30 | 50 | 0 | 9 | good |
| Embodiment example 46 | 30 | 100 | 0 | 5 | excellent |
| Embodiment example 47 | 30 | 200 | 0 | 8 | good |
| Embodiment example 48 | 30 | 220 | 0 | 12 | pass |

Effect by Crystal Structure

Embodiment Example 49 to 53

Zinc alloy was prepared adding 0.3 mass % bismuth to 100 kg pure zinc. Experiments were conducted using manufacturing system as of FIG. 2 with condition shown below.

Casting machine disc diameter: 100 cm

Alloy temperature in mold: 450° C.

Zinc band temperature on exit of casting machine: 15 cm

Number of rolling twin roller: 2 pairs

An examination was conducted on the relation between a square measure covering crystals with more than 200 μm grain diameter and the number of cracks of the same zinc sheet after rolling. The outcome is shown in the Table 7 below. Measurement was done using a microscope with 100 times magnification power and net visual range 25 mm×25 mm, and projection or photograph print size 10 mm×10 mm. The section of material structure for measuring crystal grain diameter was selected from a typical and normal average area representing the relevant structure, a part without distortion or slippage of screw dislocation.

The followings are findings and conclusion thereof.

A molded band-form zinc material was easily breakable and continuous stable casting was impossible, when the material was molded in such a condition as the square measure occupied by acicular crystals shared more than 10% of the relevant cross section square measure.

A zinc sheet, rolled in such a condition as average crystal diameter in a cross section of the sheet became more than 75 μm, incited large cracks around the edge sides with extremely poor yield and poor manufacturing efficiency, and brought around fabricated batteries, some of which were defective with hidden cracks.

Similar problems like above-mentioned took place, when a zinc sheet was rolled in such a condition as a square measure occupied by the crystals of grain diameter more than 200 μm shared 10% of cross section square measure of the zinc sheet.

Accordingly it is concluded that average crystal grain diameter is preferable to be less than 75 μm in a zinc alloy sheet after rolling, and that the cross section square measure containing crystals of average grain diameter more than 200 μm preferably should share less than 10% of an optional cross section square measure of a zinc sheet.

TABLE 7

| | Cooling water temperature (° C.) | Molded band-form material temperature on entering to rolling system (° C.) | Zinc sheet crystal status at casting machine exit (acicular crystal ratio) % | Zinc sheet cross section average grain diameter (μm) (more than 200 μm square measure ratio) | Crack of zinc sheet after rolling (excellent, good, pass, failure |
|---|---|---|---|---|---|
| Embodiment example 49 | 20 | 88 | 9 | 78 μm (22%) | pass |
| Embodiment example 50 | 25 | 100 | 7 | 76 μm (9%) | good |
| Embodiment example 51 | 30 | 120 | 5 | 72 μm (8%) | excellent |

TABLE 7-continued

|  | Cooling water temperature (° C.) | Molded band-form material temperature on entering to rolling system (° C.) | Zinc sheet crystal status at casting machine exit (acicular crystal ratio) % | Zinc sheet cross section average grain diameter (μm) (more than 200 μm square measure ratio) | Crack of zinc sheet after rolling (excellent, good, pass, failure |
|---|---|---|---|---|---|
| Embodiment example 52 | 40 | 140 | 4 | 50 μm (4%) | excellent |
| Embodiment example 53 | 40 | 160 | 8 | 69 μm (7%) | excellent |
| Embodiment example 54 | 45 | 190 | 9 | 70 μm (10%) | good |
| Embodiment example 55 | 50 | 218 | 12 | 90 μm (28%) | pass |

What is claimed is:

1. A method for manufacturing non lead added anode zinc material having utility for manganese dry batteries comprising in order, at least the following steps:
compounding a zinc alloy by melting zinc, 0.1 mass % or more and 0.7 mass % or less of bismuth, and optionally 0.0005 mass % or more and 0.05 mass % or less of magnesium, and other impurity elements inevitably contained in zinc in a melting furnace; and
casting the compounded molten zinc alloy to a molded material in the form of a band by a casting system; and
rolling the molded material in said form of a band to form a zinc alloy sheet by a rolling system; and
punching the rolled zinc alloy sheet in a designated thickness into a designated shape by a punching system,
wherein
a temperature at the surface of the molded zinc alloy material in the form of a band is controlled to be 100° C. or more and 190° C. or less at the time of entering into said rolling, and
in a cross section of the cast molded band, acicular crystals make up an area less than 10% of the area of said cross section.

2. The method according to claim 1, wherein the steps are conducted continuously.

3. The method according to claim 1, wherein the steps are not conducted continuously.

4. The method according to claim 1, wherein said casting system comprises a rotate-able disc, said disc is cooled by water which flows inside of said disc, and the temperature of said water is 40° C. or below.

5. The method according to claim 4, wherein the molten zinc alloy is molded to 1 mm or more and 30 mm or less thick of the molded material in said band-form by 20 cm or more and 200 cm or less diameter of the rotate-able disc.

6. The method according to claim 1, wherein rolling is done in two to six divided times.

7. The method according to claim 1, wherein said anode zinc material consists of zinc, bismuth, other impurity elements inevitably contained and optionally magnesium.

8. A method for manufacturing non lead added anode zinc material having utility for manganese dry batteries comprising in order, at least the following steps:
compounding a zinc alloy by melting zinc, 0.1 mass % or more and 0.7 mass % or less of bismuth, and optionally 0.0005 mass % or more and 0.05 mass % or less of magnesium, and other impurity elements inevitably contained in zinc in a melting furnace, thereby obtaining a zinc alloy consisting of zinc, bismuth, optionally magnesium, and other impurity elements inevitably contained in zinc; and
casting the molten compounded zinc alloy to a molded material in the form of a bar by pouring the molten alloy into a mold; and
rolling the molded bar to a zinc alloy sheet by a rolling system; and
punching the rolled zinc alloy sheet in a designated thickness into a designated shape,
wherein
a temperature at the surface of the molded zinc alloy material in the form of a bar is controlled to be 100° C. or more and 190° C. or less at the time of entering into said rolling, and
in a cross section of the cast molded band, acicular crystals make up an area less than 10% of the area of said cross section.

9. The method according to claim 1 or claim 8, wherein average grain diameter of zinc alloy crystals is 75 μm or smaller in the zinc alloy sheet made by the rolling process.

10. The method according to claim 9, wherein the zinc alloy sheet comprises crystals larger than 200 μm grain diameter in an amount of 10% or less.

11. The method according to claim 1 or claim 8, wherein 0.0005 mass % or more and 0.05 mass % or less of magnesium are present.

12. The method according to claim 1 or claim 8, wherein a temperature is 400° C. or more and 600° C. or less in feeding the zinc alloy molten to said casting system.

13. The method according to claim 8, wherein rolling is done in two to six divided times.

14. The method according to claim 8, wherein said casting system comprises at least a water tank in which said mold is dipped, and the temperature of said water is 40° C. or below.

15. The method according to claim 8, wherein said anode zinc material consists of zinc, bismuth, other impurity elements inevitably contained and optionally magnesium.

* * * * *